United States Patent
Yves et al.

(10) Patent No.: US 7,055,953 B1
(45) Date of Patent: Jun. 6, 2006

(54) HINGE FOR SPECTACLES

(76) Inventors: Chagny Yves, 2 Rue du champ de Foire, 01100 Arbent (FR); Richard Louis, 107 Des Erables, Drummondville, Quebec (CA) J2C 1Y1

( * ) Notice: Subject to any disclaimer, the term of this patent is extended or adjusted under 35 U.S.C. 154(b) by 4 days.

(21) Appl. No.: 10/992,416

(22) Filed: Nov. 19, 2004

(51) Int. Cl.
*G02C 5/22* (2006.01)

(52) U.S. Cl. .................................. 351/153; 16/228
(58) Field of Classification Search ............. 351/153; 16/228
See application file for complete search history.

(56) References Cited

U.S. PATENT DOCUMENTS

| | | | |
|---|---|---|---|
| 3,628,215 A | 12/1971 | Everburg | |
| 4,978,209 A | 12/1990 | Ohba | |
| 4,999,008 A | 3/1991 | Milone | |
| 5,009,495 A | 4/1991 | Williams | |
| 5,059,017 A * | 10/1991 | Bennato | ................ 351/121 |
| 5,596,789 A | 1/1997 | Simioni | |
| 5,791,015 A | 8/1998 | Wandinger | |
| 6,019,467 A | 2/2000 | Kawamoto | |
| 6,050,686 A | 4/2000 | Rossi | |
| 6,139,143 A | 10/2000 | Brune et al. | |
| 6,247,810 B1 | 6/2001 | Hirano | |
| 6,393,609 B1 | 5/2002 | Simmons | |
| 6,454,407 B1 | 9/2002 | Mille | |
| 6,481,053 B1 | 11/2002 | Desbiez-Piat | |
| 6,557,997 B1 | 5/2003 | Sieberg | |
| 6,736,503 B1 | 5/2004 | Chen | |
| 6,926,404 B1 * | 8/2005 | Bassahon et al. | ........... 351/103 |
| 2003/0184709 A1 | 10/2003 | Sommavilla | |

FOREIGN PATENT DOCUMENTS

EP 93 00271 7/1994

* cited by examiner

*Primary Examiner*—Huy Mai
(74) *Attorney, Agent, or Firm*—François Martineau

(57) ABSTRACT

The hinge is for use on spectacles of the type comprising a front frame for carrying lenses and a pair of temples. The hinge comprises a first attachment device for attaching the hinge to a corresponding one of the temples, a second attachment device for attaching the hinge to the frame, a rigid intermediate portion, a first flexible resilient portion carrying the first attachment device and attached to the rigid intermediate portion, and a second flexible resilient portion carrying the second attachment device and attached to the rigid intermediate portion opposite the first resilient portion.

15 Claims, 4 Drawing Sheets

HINGE FOR SPECTACLES

FIELD OF THE INVENTION

The present invention relates to spectacles, and more particularly to a hinge for spectacles.

BACKGROUND OF THE INVENTION

It is known to provide flexible resilient members to link the temples of spectacles to the front frame thereof. These flexible resilient members allow a hinged attachment of the temples to the spectacle frame, thus allowing the temples to be pivoted between an inward stored position in which the temples extend parallel to and along the frame, and an operative position in which the temples extend perpendicularly to and away from the frame to engage the wearer's head above his ears. The flexible resilient hinges have the advantage of further allowing the temples to be pivoted outwardly away from the spectacles frame beyond their operative position without damaging the hinge. This is useful in cases where the temples are accidentally moved beyond their operative position, to prevent the hinge, the temples and/or the frame from being damaged.

These resilient hinges also offer a spring-back effect that will continuously bias the temples towards the respective sides of the head of the person wearing the spectacles, which helps to securely hold the spectacles against the wearer's head. Some such spectacles with temples having this spring-back effect are called sports glasses due to the fact that they will hold on to the wearer's head even under sudden movements of the head such as those that occur during sporting activities.

SUMMARY OF THE INVENTION

The present invention relates to a hinge for use on spectacles of the type comprising a front frame for carrying lenses and a pair of temples, said hinge comprising:
  a first attachment device for attaching said hinge to a corresponding one of the temples;
  a second attachment device for attaching said hinge to said frame;
  a rigid intermediate portion;
  a first flexible resilient portion carrying said first attachment device and attached to said rigid intermediate portion; and
  a second flexible resilient portion carrying said second attachment device and attached to said rigid intermediate portion opposite said first resilient portion.

In one embodiment, said first and second resilient portions are made of a polymeric material having an intrinsic resiliency.

In one embodiment, said intermediate portion comprises a rigid metallic piece extending between said first and second resilient portions and attached thereto.

In one embodiment, said hinge further comprises a unitary flexible resilient member defining first and second ends and reinforced with a rigid element fixedly attached to said unitary resilient member between and spaced from said first and second ends, with said first resilient portion being defined between said first end and said rigid element, with said second resilient portion being defined between said second end and said rigid element, and with said rigid intermediate portion being defined at the position of said rigid element.

In one embodiment, said first and second attachment devices comprise tenon and mortise joint means for engagement with complementary tenon and mortise joint means provided on the temple and the frame, respectively.

In one embodiment, said hinge further comprises a pair of grooves each provided on either side of and adjacent said intermediate portion allowing said first and second resilient portions to collapse towards and against said intermediate portion.

The present invention further relates to spectacles comprising a front frame for carrying lenses, a pair of temples and a pair of hinges each linking a corresponding one of said temples to said frame, each said hinge comprising:
  a first attachment device attaching said hinge to a corresponding one of said temples;
  a second attachment device attaching said hinge to said frame, whereby said temple is hingedly attached to said frame;
  a rigid intermediate portion;
  a first flexible resilient portion carrying said first attachment device and attached to said rigid intermediate portion; and
  a second flexible resilient portion carrying said second attachment device and attached to said rigid intermediate portion opposite said first resilient portion;

wherein each said temple can be pivoted with its corresponding said hinge relative to said frame between a stored position in which said temple is unbiased by said hinge and in which said temple is pivoted adjacent to said frame; an operative position in which said temple is pivoted away from said frame, is substantially perpendicular to said frame and is biased towards said stored position under the effect of a first spring-back biasing force exerted by said first and second resilient portions; and a spread out position in which said temple is pivoted outwardly away from said frame beyond said operative position and is biased towards said stored position under the effect of a second spring-back biasing force exerted by said first and second resilient portions, with said second spring-back biasing force being greater than said first spring-back biasing force.

DETAILED DESCRIPTION OF THE EMBODIMENTS

Figure 1:
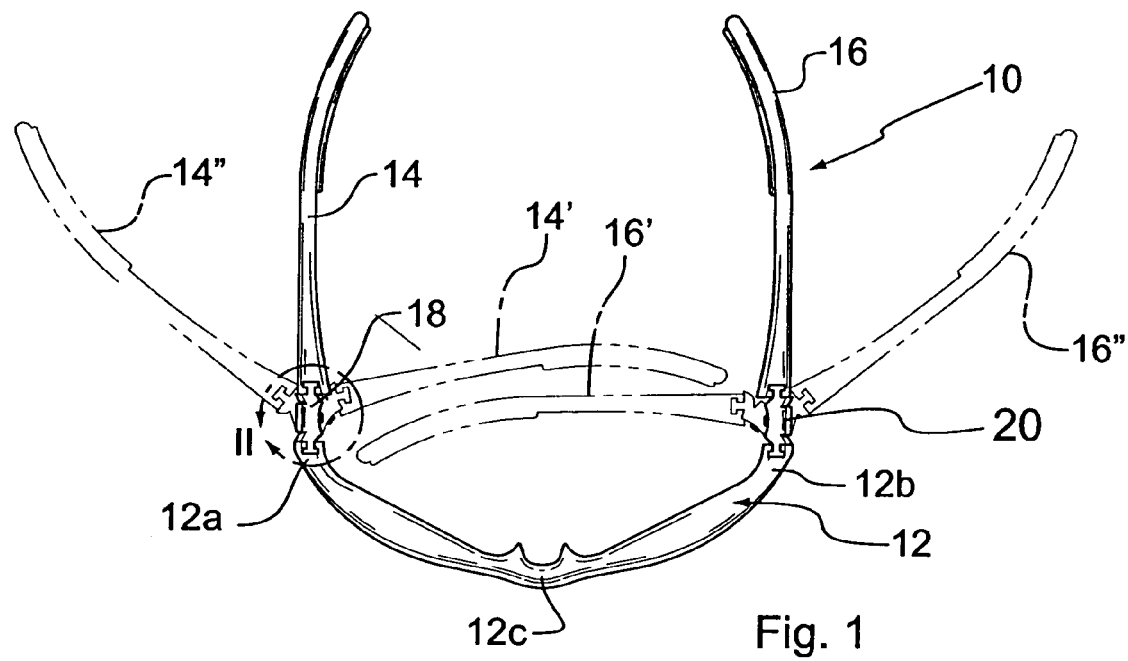
FIG. 1 is a bottom plan view of the spectacles according to a first embodiment of the present invention, showing the temples in full lines in their operative position, and further showing in phantom lines the temples in two alternate positions, namely in a stored and in a spread out position.
Figure 2:
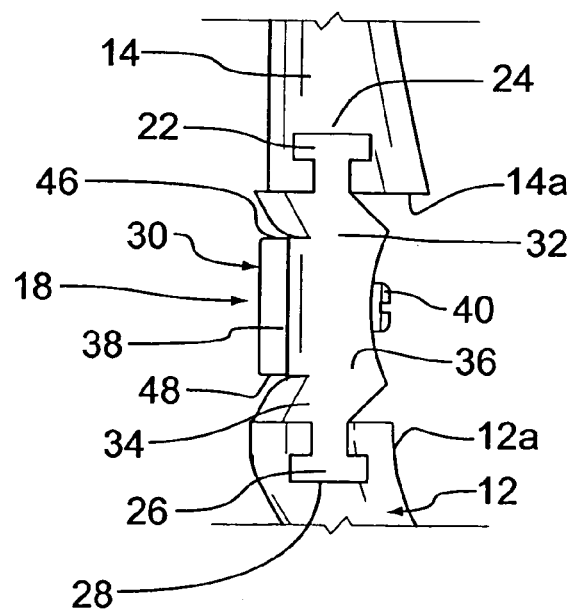
FIG. 2 is an enlarged view of the area circumscribed by circle II of FIG. 1.
Figure 3:
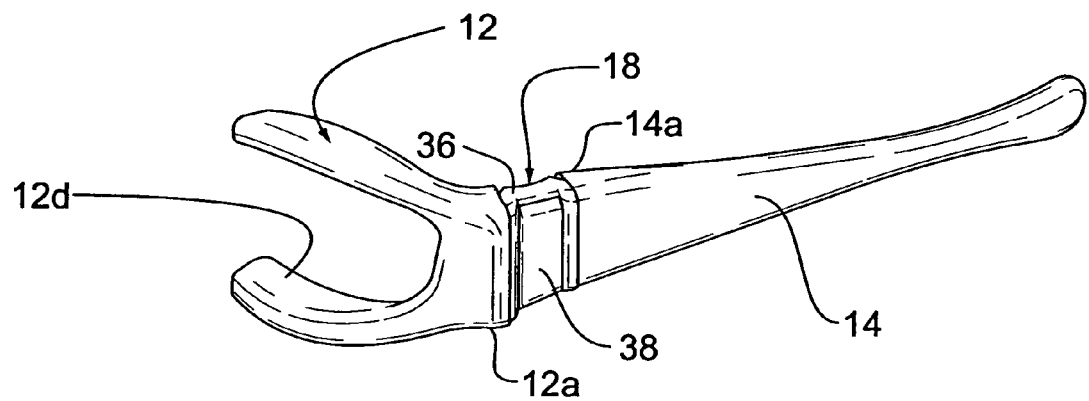
FIG. 3 is a partial top and front perspective view of the spectacles of FIG. 1, including one temple, one hinge and part of the front frame.

FIGS. 1–5 show a first embodiment of spectacles 10 according to the invention, that comprise a front frame 12 for carrying lenses (not shown), a pair of temples 14, 16 and a pair of hinges 18, 20 each linking a corresponding one of temples 14, 16 to frame 12. Front frame 12 is of a conventional shape, and defines opposite first and second extremities 12a, 12b, a nose bridge 12c and first and second lens openings 12d, 12e for carrying selected lenses therein. Frame 12 may be arcuate, as illustrated, or flat, or other suitable shape, such that frame 12 forms a general plane adapted to fit over the nose and ahead of the wearer's eyes.

Each hinge 18, 20, for example hinge 18 shown in FIGS. 1–3 and 5, comprises a first attachment device attaching hinge 18 to its corresponding temple 14, in the form of a tenon and mortise joint means that includes a tenon or cross-sectionally T-shaped lip 22 that engages a complementary tenon and mortise joint means in temple 14 in the form of a mortise or cross-sectionally T-shaped slot 24 made in the temple extremity 14a attached to adjacent frame extremity 12a. It is understood that the tenon and mortise joint means could be inverted, i.e. the protruding lip could be provided on the temple and the slot could be provided on the hinge; and more generally, any other suitable male-female attachment device can be envisioned including for example any similar male and female dovetail interlock joint means, of various shapes, or any suitable adhesive or small bolts, provided they do not hamper pivotal capability of temple 14 relative to frame 12 about hinge 18 as above noted.

Hinge 18 also comprises a second attachment device attaching hinge 18 to the corresponding extremity 12a of frame 12, in the form of a tenon and mortise joint means that includes a tenon or cross-sectionally T-shaped lip 26 that engages a complementary tenon and mortise joint means in frame 12 in the form of a mortise or cross-sectionally T-shaped slot 28 made in the frame extremity 12a attached to temple 14. It is understood that the tenon and mortise joint means could be inverted, i.e. the protruding lip could be provided on the frame and the slot could be provided on the hinge; and more generally, any other suitable male-female attachment device can be envisioned including for example any similar male and female dovetail interlock joint means, of various shapes, provided they do not hamper pivotal capability of temple 16 relative to frame 12 about hinge 18 as above noted, or any suitable adhesive or small bolts.

In the embodiment shown in FIGS. 1–5, slots 24, 28 respectively made in temple 14 and frame 12 are opened at the underside of spectacles 10 and are close-ended, in that they do not extend for the full height of temple 14 and frame 12. Consequently, lips 22 and 26 can be upwardly slidably inserted in their respective slots 24 and 28 from underneath, with lips 22, 26 abutting against the closed ends of slots 24, 28. The engagement of lips 22, 26 in slots 24, 28 is preferably of the friction fit type engagement, to prevent lips 22, 26 from accidentally sliding our of slots 24, 28.

Hinge 18 also defines a rigid intermediate portion 30, a first flexible resilient portion 32 carrying lip 22 and a second flexible resilient portion 34 carrying lip 26. More particularly, in the embodiment of FIGS. 1–5, hinge 18 comprises a unitary resilient member 36 that extends between temple 14 and frame 12, including lip 22 at a first end and lip 26 at a second end of resilient member 36. A rigid element in the form of a rigid, flat, vertical metallic plate 38 is fixedly attached to unitary resilient member 36 between and spaced from its first and second ends, facing outwardly of spectacles 10. The first resilient portion 32 is more particularly defined between rigid plate 38 and the resilient member first end at lip 22; the second resilient portion 34 is more particularly defined between rigid plate 38 and the resilient member second end at lip 26; and the rigid intermediate portion 30 is more particularly defined at the position of rigid plate 38. Rigid plate 38 is attached to the unitary resilient member 36 by means of a pair of screws 40 that are driven through resilient member 36 and into complementary threaded sockets 42 integrally attached to rigid plate 38 and that extend within holes 44 made through resilient member 36 (see particularly FIG. 5).

Hinge 18 further comprises a pair of grooves 46, 48 made in resilient member 36 and each provided on either side of and adjacent intermediate portion 30, facing outwardly of spectacles 10.

It is understood that hinge 20 is a mirror image of hinge 18, and consequently although hinge 20 is not detailed herein, it is understood that the present description of hinge 18 also applies to hinge 20.

In one embodiment, the first and second resilient portions 32, 34, of hinges 18, 20, are made of a polymeric material having an intrinsic resiliency, such as rubber. One material which may be used is the thermoplastic elastomer sold under the registered trade-mark FORPRENE, by the company So.F.Ter. Spa located in Forli, Italy.

In use, spectacles 10 are assembled by friction-fitting the lips 22, 26 of hinges 18, 20 into the corresponding temple openings 24 and front frame openings 28 respectively as described hereinabove, to hingedly attach temples 14, 16 to front frame 12. More particularly, as suggested in FIG. 1, temples 14, 16 are hinged to frame 12 in such a way as to allow temples 14, 16 to pivot between:

a) a stored position shown in phantom lines at 14', 16' in FIG. 1, in which temples 14, 16, are pivoted towards and are positioned generally parallel to the general plane of front frame 12, and in which hinges 18, 20 are in a rest position (shown in FIG. 5 for example), i.e. hinges 18, 20 do not bias temples 14, 16 towards or away from front frame 12;

b) an operative position shown in full lines at 14, 16 in FIG. 1, in which temples 14, 16, are pivoted away from and are positioned generally perpendicular to the general plane of front frame 12 for engaging a wearer's head over his ears as known in the art, and in which hinges 18, 20 are in slightly compressed compared to their rest position and continuously bias temples 14, 16 towards their rest position due to the intrinsic resiliency of the hinge resilient portions 32 and 34, thus allowing for a more stable engagement of spectacles 10 on the wearer's head; and c) a spread out position shown in phantom lines at 14", 16" in FIG. 1, in which temples 14, 16, are pivoted outwardly away from their operative position and yet further away from frame 12, and in which hinges 18, 20 significantly bias temples 14, 16 inwardly towards their rest position.

Figure 5:
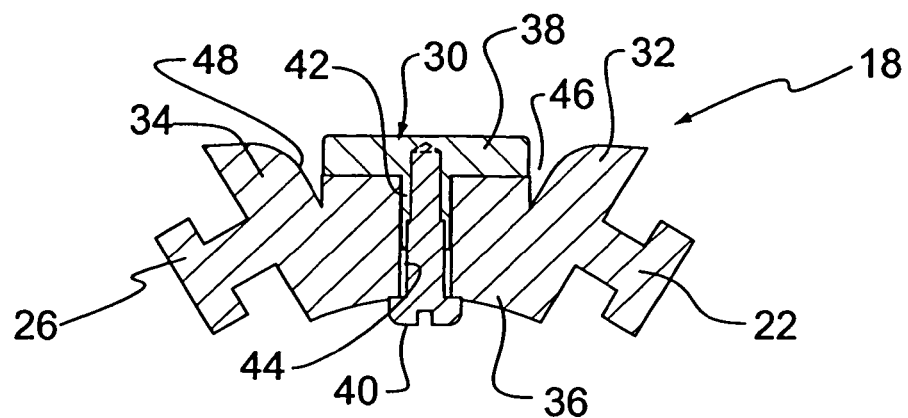
FIG. 5 is a cross-sectional view of the hinge only of the spectacles, taken along line V—V of FIG. 4.
Figure 4:
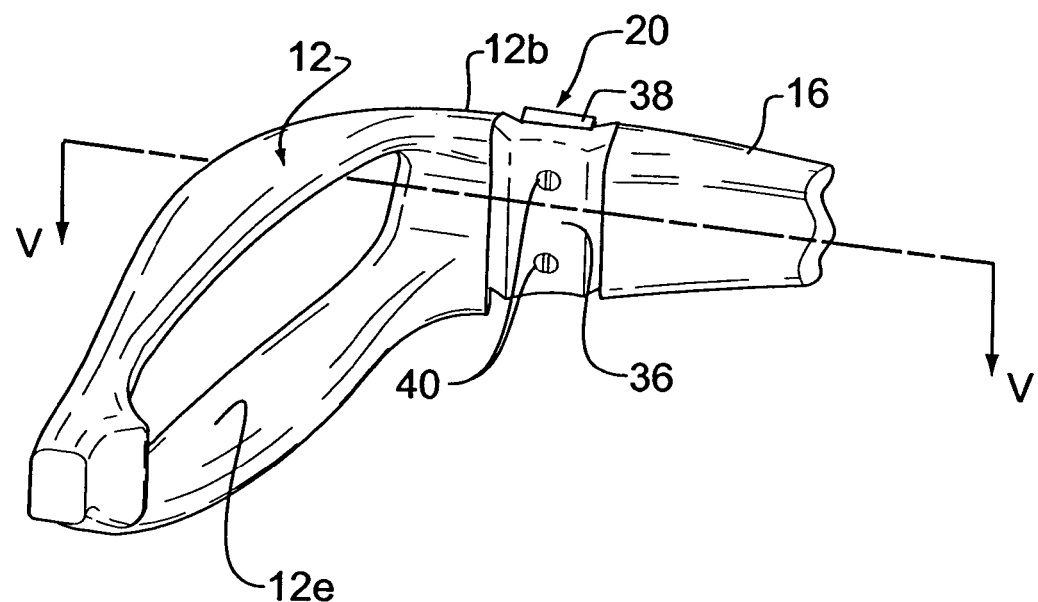
FIG. 4 is a partial top and rear perspective view at an enlarged scale of the spectacles of FIG. 1, including one hinge and the adjacent parts of the front frame and corresponding temple.

It can be seen that each hinge 18, 20, for example hinge 18 as shown in FIG. 5, is designed to promote the two-tiered biasing force distribution suggested hereinabove according to the angular position of its corresponding temple 14. Indeed, in the rest position of hinge 18, resilient member 36 naturally forms an elbow with lips 22, 26 extending in divergent directions. Consequently, if no outside force is exerted on temple 14, it will adopt its stored position. This is desirable, since having the temples 14, 16 extending along frame 12 in a stored position provides a more compact shape to spectacles 10 that favors easy storing thereof and reduces likelihood of accidental damage thereto.

However, as temple 14 is pivoted away from its rest position and towards its operative position, resilient member 36 will bend, mainly at grooves 46, 48 that offer a weaker resistance area on resilient member 36, with the first and second resilient portions 32, 34 collapsing towards rigid intermediate portion 30. The latter, being reinforced by rigid plate 38, will not compress. Thus, a first spring-back biasing force is then exerted on temple 14 by hinge 18, which first spring-back biasing force is calibrated to offer a desirable inwardly oriented pressure against a person's head around that person's ears when spectacles 10 are worn.

It is further desirable to allow temple 14 to be pivoted further outwardly away from its operative position, for example into the spread out position shown at 14", 16". In such an angular position of temple 14 outwardly beyond its operative position, the first and second resilient portions 32, 34 of hinge 18 have collapsed against rigid intermediate portion 30, and the angular displacement of temple 14 beyond its operative position is allowed by the compression of first and second resilient portions 32, 34 between the temple extremity 14a and the rigid plate-reinforced intermediate hinge portion 30. This compression of first and second resilient portions 32, 34 provides a second spring-back biasing force which is greater than the above-mentioned first spring-back biasing force.

This second spring-back biasing force of greater value than that of the first spring-back biasing force is desirable to ensure that temple 14 will move back towards the wearer's head with haste if it is accidentally pulled away, which is especially advantageous on sports glasses. However, one would not want such a powerful spring-back biasing force applied to temple 14 at all times since it would then become uncomfortable for the wearer of spectacles 10 who would feel considerable pressure against the sides of his head. Also, allowing temple 14 to pivot outwardly beyond its operative position into a spread-out position, is desirable since it prevents hinge 18, temple 14 and/or frame 12 from being damaged or broken if temple 14 is accidentally pulled outwardly away beyond its operative position.

It can be seen that throughout the pivotal displacement of temple 14 from its operative position towards its spread out position, the hinge rigid intermediate portion 30 will provide a seat against which first and second resilient portions 32, 34 may abut.

It is understood that grooves 46, 48 are facultative. In the absence of grooves 46, 48, a resilient member 36 could be designed having a geometry allowing for a gradual increase of the spring-back biasing force exerted by hinge 18 as temple 14 is pivoted away from its stored position. The optimal angular value of temples 14", 16" at their spread-out position is a large acute angle relative to their operative position 14, 16, generally perpendicular to frame 12, preferably between 30 and 60°, and most preferably about 45°.

Figure 7:
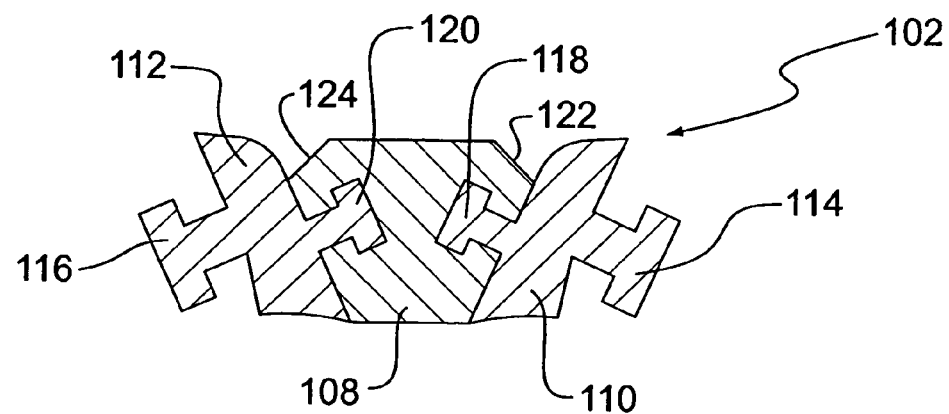
FIG. 7 is an enlarged cross-sectional view of the hinge only of the spectacles of FIG. 6, taken along line VII—VII of FIG. 6.
Figure 6:
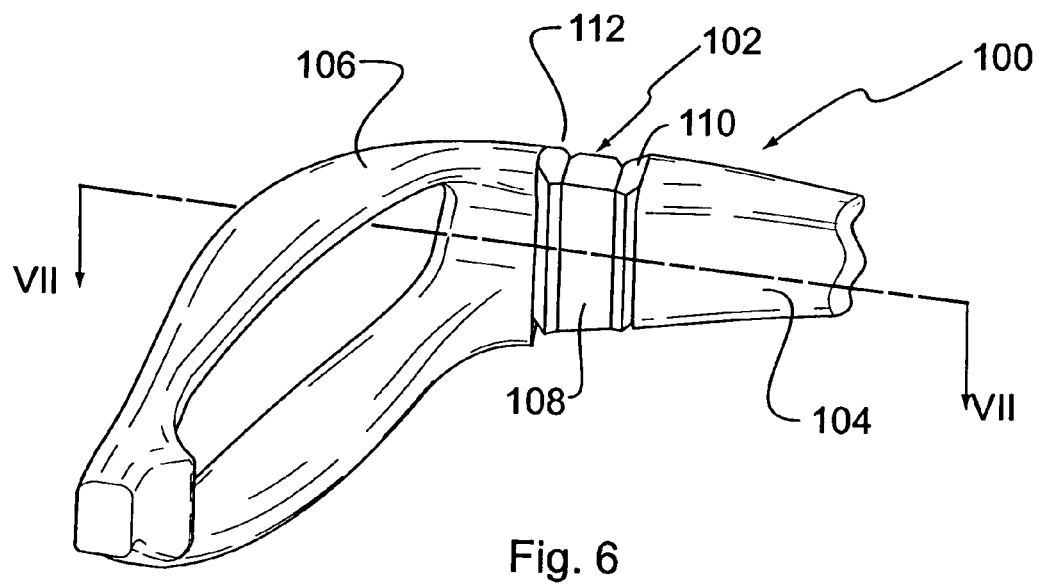
FIG. 6 is similar to FIG. 4, but pertains to an alternate embodiment of the invention.

FIGS. 6 and 7 show another embodiment of the present invention, which is similar to the embodiment shown in FIGS. 1–5 except as noted hereinafter.

In the embodiment of FIGS. 6–7, spectacles 100 comprise a hinge 102 linking the temple 104 to the front frame 106. Hinge 102, similarly to hinges 18, 20 of the first embodiment, comprises a rigid intermediate portion 108 flanked by first and second flexible resilient portions 110, 112 located on either side of intermediate portion 108. First and second resilient portions 110, 112 are respectively provided with first and second tenon and mortise joint means 114, 116 that cooperate with respective complementary tenon and mortise joint means (not shown) provided on temple 104 and on frame 106 for attaching hinge 102 to temple 104 and to frame 106, thereby effectively hingedly attaching temple 104 to frame 106.

According to the second embodiment of the invention, hinge 102 comprises an intermediate portion 108 made from a rigid metallic piece extending between first and second resilient portions 110, 112 and attached thereto by means of additional tenon and mortise joint means 118, 120. Thus, the hinge 102 of the second embodiment is not made of a unitary resilient member as per the first embodiment, but rather from a pair of distinct first and second resilient members that form the first and second resilient portions 110, 112, and from a rigid metallic piece attached between and linking the first and second resilient members.

Similarly to the first embodiment shown in FIG. 105, grooves 122, 124 may be provided on the outer surface (relative to the entire spectacles 100) of hinge 102, to facilitate the resilient pivotal displacement of temple 104 relative to flame 106 between the stored position and the operative position of temple 104. However, when temple 104 reaches its operative position in which it extends substantially perpendicularly to frame 106, first and second resilient portions 110, 112 have collapsed and become seated against rigid intermediate portion 108 to increase the elastic resistance of any further outward pivotal displacement of temple 104 beyond its operative position towards a spread out position.

It has been found that with either type of the above noted embodiments of hinges according to the present invention, an unexpectedly large increase in resistance to wear and in sturdiness were obtained. Accordingly, eyewear integrating these temple hinges should be much more longer lasting than prior art eyewear.

Any further modification obvious for someone skilled in the art is considered to be included herein, as may be ascertained from the appended claims.

We claim:

1. A hinge for use of spectacles comprising a front frame for carrying lenses and a pair of temples, said hinge comprising:
   a first attachment device for attaching said hinge to a corresponding one of the temples;
   a second attachment device for attaching said hinge to said frame;
   a rigid intermediate portion comprising a rigid inflexible member;
   a flexible first resilient portion carrying said first attachment device and attached to said rigid intermediate portion; and
   a flexible second resilient portion carrying said second attachment device and attached to said rigid intermediate portion opposite said first resilient portion.

2. A hinge as defined in claim 1, wherein said first resilient portion and said second resilient portion are made of a polymeric material having an intrinsic resiliency.

3. A hinge as defined in claim 2, wherein said intermediate portion comprises a rigid metallic piece extending between said first resilient portion and said second resilient portion and attached thereto.

4. A hinge as defined in claim 1, further comprising a flexible unitary resilient member defining first and second ends and reinforced with a rigid element fixedly attached to said unitary resilient member between and spaced from said first and second ends, with said first resilient portion being defined between said first end and said rigid element, with said second resilient portion being defined between said second end and said rigid element, and with said rigid intermediate portion being defined at the position of said rigid element.

5. A hinge as defined in claim 1, wherein said first attachment device and said second attachment device comprise tenon and mortise joint means for interlock engagement with complementary tenon and mortise joint means provided on the temple and the frame, respectively.

6. A hinge as defined in claim 1, further comprising a pair of grooves each provided on either side of and adjacent said intermediate portion allowing said first resilient portion and said second resilient portion to collapse towards and against said intermediate portion.

7. Spectacles comprising a front frame for carrying lenses over the nose of a wearer, a pair of temples and a pair of hinges each linking a corresponding one of said temples to said frame, each of said hinges comprising:
 a first attachment device attaching said hinge to a corresponding one of said temples;
 a second attachment device attaching said hinge to said frame, whereby said temple is hingedly attached to said frame;
 a rigid intermediate portion;
 a flexible first resilient portion carrying said first attachment device and attached to said rigid intermediate portion; and
 a flexible second resilient portion carrying said second attachment device and attached to said rigid intermediate portion opposite said first resilient portion;
wherein each of said temples can be pivoted with its corresponding one of said hinges relative to said frame between a stored position, in which said temple is unbiased by said hinge and in which said temple is pivoted adjacent to said frame; an operative position in which said temple is pivoted away from said frame, is substantially perpendicular to the general plane of said frame and is biased towards said stored position under the effect of a first spring-back biasing force exerted by said first resilient portion and second resilient portion; and a spread out position, in which said temple is pivoted outwardly away from said frame beyond said operative position and is biased towards said stored position under the effect of a second spring-back biasing force exerted by said first and second resilient portions, with said second spring-back biasing force being greater than said first spring-back biasing force.

8. Spectacles as defined in claim 7, wherein said first resilient portion and said second resilient portion are made of a polymeric material having an intrinsic resiliency.

9. Spectacles as defined in claim 8, wherein said intermediate portion comprises a flexible rigid metallic piece extending between said first resilient portion and said second resilient portion and attached thereto.

10. Spectacles as defined in claim 7, further comprising a flexible unitary resilient member defining first and second ends and reinforced with a rigid element fixedly attached to said unitary resilient member between and spaced from said first and second ends, with said first resilient portion being defined between said first end and said rigid element, with said second resilient portion being defined between second end and said rigid element, and with said rigid intermediate portion being defined at the position of said rigid element.

11. Spectacles as defined in claim 7, wherein said first attachment device and said second attachment device comprise tenon and mortise joint means engaged interlockingly with complementary tenon and mortise joint means provided on said temple and said frame, respectively.

12. Spectacles as defined in claim 7, further comprising a pair of grooves each provided on either side of and adjacent said intermediate portion allowing said first resilient portion and said second resilient portion to collapse towards and against said intermediate portion.

13. Spectacles as defined in claim 7, wherein said spread out position of each of said temple forms a large acute angle relative to said operative position thereof.

14. Spectacles as in claim 13, wherein the optimal value of said large acute angle ranges between 30 and 60°.

15. Spectacles as in claim 14, wherein said optimal value of said large acute angle is about 45°.

* * * * *